F. BUTLER.
SPOON HOLDER.
APPLICATION FILED APR. 14, 1915.
1,188,147.
Patented June 20, 1916.
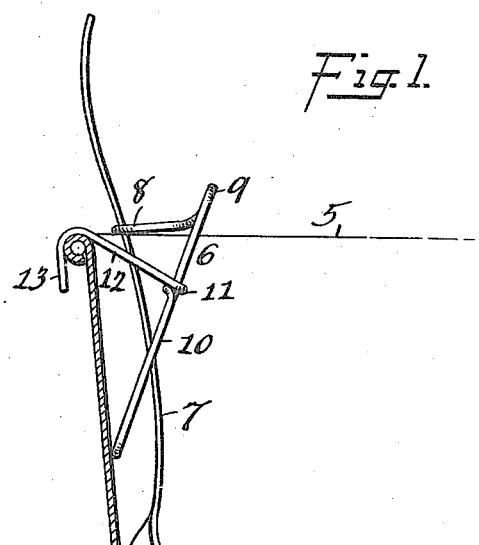
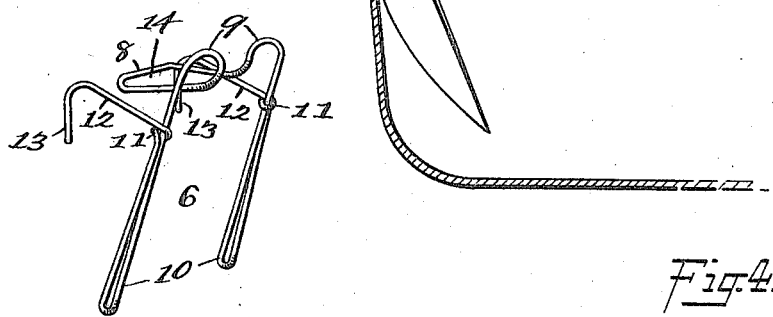
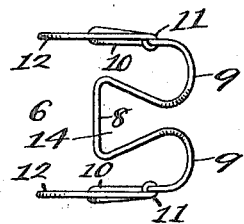
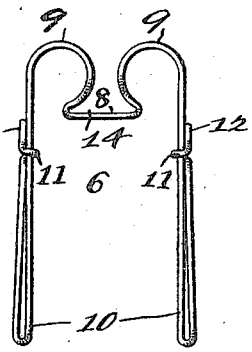
WITNESSES
George L. Blume.
J. E. Larsen.
INVENTOR
Frank Butler
BY
ATTORNEYS

UNITED STATES PATENT OFFICE.

FRANK BUTLER, OF OXNARD, CALIFORNIA.

SPOON-HOLDER.

1,188,147.     Specification of Letters Patent.     Patented June 20, 1916.

Application filed April 14, 1915. Serial No. 21,239.

*To all whom it may concern:*

Be it known that I, FRANK BUTLER, a citizen of the United States, and a resident of Oxnard, in the county of Ventura and State of California, have invented certain new and useful Improvements in Spoon-Holders, of which the following is a specification.

My invention relates to means for holding spoons, forks, and the like, in a readily accessible position for use is bowls, pots, pans, etc., in such manner as to prevent their falling into the contents of the vessel, as when mixing or cooking in or serving from said vessel.

It is the experience of all housewives, cooks, maids, etc., that, in using a spoon, fork, ladle, or the like, it is frequently desired to temporarily dispense therewith in order to use the hands for other purposes, and the nature of the contents of a vessel often renders it inadvisable to lay the spoon or the like upon the table or stove; sometimes the spoon is placed upon the edge of the vessel and falls into said vessel, thus requiring that it be fished therefrom completely coated with the contents of the vessel, and it was in order to overcome this frequent occurrence that my invention was conceived.

My invention is fully described in the following specification, of which the accompanying drawings form a part, in which like reference characters refer to like parts in each of the views, and in which:—

Figure 1 is a fragmentary section taken through a pan provided with a spoon suspended from my invention; Fig. 2 is a perspective view of the invention removed from the pan; Fig. 3 is a view thereof from the inner side; and Fig. 4 is a top plan view thereof.

In Fig. 1 of the drawings I have shown a pot or pan 5 from the edge of which depends my device 6 supporting a spoon 7 against any possibility of its falling into said pot or pan and still being in a readily accessible position when it is desired to use the same.

The device is formed of a single length of wire formed centrally thereof into a yoke 8, preferably of triangular form, the resultant arms thereof being then bent upwardly and downwardly to form loops 9 and dependent legs 10 of a desired length, said arms being then doubled and carried upwardly along the respective legs to a point intermediate the height of said legs; the wire is then twisted about the respective legs 10, as shown at 11, and projected from said legs, perpendicular thereto, to form extensions 12 in turn bent downwardly to form hook members 13 adapted for engagement with the edge of the vessel 5.

By reference to Figs. 3 and 4 it will be noted that a space 14 is provided between the loops 9 to permit the passage of the shank of the spoon or other utensil, but the extreme width of the yoke 8 is less than the width of the upper end of the handle of said utensil, thus preventing said utensil from falling downwardly through the yoke 8 although permitting the instant removal thereof from, or instant connection thereof with, the device 6.

The device may be readily hooked over the edge of any kind of cooking or containing vessel with which a spoon or the like is desired to be used, and at any point along the edge thereof, and it will be seen that the spoon or the like is safely supported from said edge regardless of the height of the sides of the vessel. If desired, the device may also be used on a table to hold the coated bowl of a spoon or the greasy tines of a fork above the table, the hooks 13 and legs 10 then supporting the yoke 8 well above the surface of the table, and the device will hold a carving-knife blade clear of the table in such position equally well.

It will thus be seen that I provide a device of the class described of the utmost simplicity though well adapted to the uses for which it was designed, and I may make the same of any desired material and of any size, according to the use to which it is to be put, such as precious metals for table use and galvanized or enameled metal for kitchen use, and I may modify the same, within the scope of the following claim, to meet varying conditions.

Having fully described my invention, what I claim as new, and desire to secure by Letters Patent, is:—

As an article of manufacture, a spoon holder, consisting of a single length of wire bent centrally to form a horizontal yoke member, the resultant arms being then bent upwardly outwardly and then downwardly to form loops and dependent legs spaced apart, the wire arms being then bent upwardly to double the legs for a predetermined portion of the lengths thereof and coiled around the respective legs, the wire arms being then directed rearwardly of and perpendicular to the respective legs beneath and approximately parallel to said yoke and bent downwardly to form hook members at a material distance from the respective legs, said hook members being adapted for engagement with the edge of a culinary vessel and of sufficient length to dispose said legs at a distinct angle with respect to the side of said vessel to overhang the interior of the vessel and be maintained in place by gravity, and said yoke being adapted to engage the handle of a spoon or the like to suspend the same above the bottom of said vessel.

In testimony whereof I have signed this specification in the presence of two subscribing witnesses.

FRANK BUTLER.

Witnesses:
FRANK WASSERMAN,
H. P. SPEER.